Patented Nov. 29, 1938

2,138,804

UNITED STATES PATENT OFFICE 2,138,804

CHEWING GUM

Clarence H. Flint, Westport, Conn., assignor to Peter Paul, Inc., Naugatuck, Conn., a corporation of Delaware No Drawing. Application December 24, 1937, Serial No. 181,607

4 Claims. (Cl. 99—135)

My present invention relates to chewing gum and is predicated upon my discovery that many beneficial results are had by incorporating in the gum a quantity of activated carbon.

A number of proposals have been made to incorporate charcoal, for example, in chewing gum. Thus in Patent 1,052,872 to William Erastus Williams, charcoal in granular form is added to the amount of about 1% of the chicle, or insoluble gum, "for the purpose of imparting a gratifying sensation in chewing and a freedom from stickiness not otherwise obtained", and also "as a polishing material for the teeth". Williams also proposed the use of wheat charcoal as distinguished from wood charcoal, but while he described the method of charring the wheat he did not take any steps to activate the charcoal so obtained. As a matter of fact, activated carbon as it is now known today was not known in 1911, the year this patent application was filed. The patent to Scott 1,741,589 discloses the thought of sandwiching a layer of charcoal between sheets of gum in order to render more palatable the taking of charcoal. In Patent 1,416,242 to Steinemann, charcoal is mentioned as an abrasive ingredient in chewing gum.

All of these references to charcoal do not touch upon my invention on the use of activated carbon, the properties of which are entirely different from those of ordinary charcoal. Some of these differences are as follows: As revealed by X-ray, activated carbon is in the graphitic state, whereas ordinary charcoal is amorphous. During the process of activation the carbon acquires an enormous number of ultramicroscopic capillaries or pores which are believed to result in its great adsorptive properties and to be responsible for the fact that material selectively adsorbed is held much more tenaciously than is the case with ordinary charcoal, which has a surface action and readily yields up the adsorbed material. (See Chaney, Transactions American Electrochemical Society, 36, 91 (1919); Barker, Journal of Industrial and Engineering Chemistry, 22, 926–931 (1930).) Barker, mentioned, gives the figures for the activity of activated carbon in comparison with those for wood charcoal, giving for ordinary charcoal the value of 11 and for activated wood charcoal of the highest type 1480, these figures being the milligrams of carbon tetrachloride absorbed per gram of the substances. This means that, generally speaking, the activity of activated carbon is of an entirely different order from that of ordinary charcoal.

In order that my invention may be best understood, the following formula is given illustrative thereof:

| | |
|---|---|
| Gum base | 20 lbs. |
| Glucose | 20 lbs. |
| Sugar | 60 lbs. |
| Activated carbon | 3½ lbs. |
| Flavoring material | 16 ozs. | the ingredients being compounded and mixed in the manner usual in the art.

The preferred amount of carbon in accordance with the foregoing example is about 3% of the finished gum, and since the quantity of mix given will yield about 20,000 sticks, the activated carbon per stick is about 1 grain. This amount of carbon may be increased or decreased somewhat. Increasing the amount of carbon substantially over that stated will, however, cause a certain drying of the mix which is objectionable, so that I would set 4% as the practical upper limit for the amount of activated carbon to be used. While certain benefits will be obtained upon using less activated carbon, the best results are to be had when the amount thereof is at least 2% of the weight of the finished product.

The activated carbon used is preferably that made from waste soda liquor obtained in the manufacture of wood pulp, and sold under the trade name "Nuchar", although the invention is not limited to this source of activated carbon. In the manufacture of this type of activated carbon the lignin residues from the soda liquor are carbonized, the carbon obtained is leached to remove mineral matters and then activated by slow roasting under oxidizing conditions either with steam or air, or both. Contrary to the practice of others in reference to ordinary charcoal, I prefer that the activated carbon be finely ground, i. e., 100 mesh or finer. Its activity, as above stated, is of an entirely different order from ordinary charcoal.

Chewing gum so made has several important advantages among which may be mentioned the following. In the first place, the activated carbon absorbs the flavoring materials and yields them up during the chewing process in such manner as to greatly prolong the flavor retention. The problem heretofore has been to make a chewing gum which did not release substantially all its flavor during the first few minutes of chewing. In the second place, because of its content in activated carbon the gum is effective to sweeten the mouth by removing odorous and toxic substances. All these beneficial properties are obtained, however, without impairing the chewing qualities of the gum, i. e., without making it "short" or in any way objectionable to the user. It does not, for example, blacken the tongue or the teeth. If it were attempted to obtain even a substantial fraction of these benefits using ordinary charcoal, the amount necessary would be so great that the product could no longer be classed as a chewing gum.

Having best described my invention, what I claim is:

1. Chewing gum containing flavoring material, characterized by a greater flavor retention when chewed, and substantial mouth sweetening properties, said gum containing as the active ingredient activated carbon in an amount insufficient to alter substantially the chewing characteristics of the gum.

2. Chewing gum containing flavoring material and activated carbon in finely divided form in an amount to appreciably increase the retention of flavoring material and afford substantial mouth sweetening action but insufficient to alter substantially the chewing properties of the gum.

3. The addition of activated carbon to chewing gum material in an amount insufficient to alter substantially the chewing characteristics of the gum, but sufficient to apreciably increase the retention of flavoring material.

4. Chewing gum comprising a gum base, sugar, flavoring material and activated carbon, such activated carbon being on the order of 3% of the finished gum but not substantially exceeding 4% thereof.

CLARENCE H. FLINT.